United States Patent
Morikuni et al.

(10) Patent No.: US 7,283,697 B1
(45) Date of Patent: Oct. 16, 2007

(54) POINT TO STRIP OPTICAL COMMUNICATION SYSTEM

(75) Inventors: James J. Morikuni, Itasca, IL (US); Gary K. Mui, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/538,326

(22) Filed: Oct. 3, 2006

(51) Int. Cl.
*G02B 6/00* (2006.01)
*G02B 6/26* (2006.01)
*H04M 1/00* (2006.01)

(52) U.S. Cl. .............. 385/14; 385/27; 385/31; 385/39; 379/433.12; 455/566.1; 455/575.1

(58) Field of Classification Search .......... 385/14–15, 385/31, 39, 27, 92; 379/433.12; 455/556.1, 455/575.1
See application file for complete search history.

(56) References Cited

U.S. PATENT DOCUMENTS

| 5,101,460 | A | 3/1992 | Richard |
| 5,245,622 | A | 9/1993 | Jewell et al. |
| 5,355,242 | A | 10/1994 | Eastmond et al. |
| 5,371,623 | A | 12/1994 | Eastmond et al. |
| 5,638,469 | A | 6/1997 | Feldman et al. |
| 5,832,147 | A | 11/1998 | Yeh et al. |
| 6,075,804 | A | 6/2000 | Deppe et al. |
| 6,765,943 | B2 | 7/2004 | Jewell |
| 2003/0064688 | A1* | 4/2003 | Mizuta et al. ............ 455/90 |
| 2003/0125008 | A1* | 7/2003 | Shimamura ............. 455/344 |
| 2004/0266477 | A1* | 12/2004 | Murata .................. 455/556.1 |
| 2007/0065090 | A1* | 3/2007 | Lin ........................ 385/147 |

OTHER PUBLICATIONS

Picolight; "Product Selection Guide"; www.picolight.com/userfiles/pdf/part_number_selector_components.pdf; 1 Page, no date.

* cited by examiner

*Primary Examiner*—Frank G. Font
*Assistant Examiner*—Michael P. Mooney
(74) *Attorney, Agent, or Firm*—Lawrence J. Chapa

(57) ABSTRACT

A point to strip optical communication system (200) for transmitting light between a first housing (102) and a second housing (104) of a device is provided. The point to strip optical communication system (200) includes a point optical communication element (202) that is capable of emitting light. The point optical communication element (202) is coupled to either the first housing (102) or the second housing (104). The point to strip optical communication system (200) also includes a strip optical communication element (204) that is coupled to either the first housing (102) or the second housing (104) to which the point optical communication element (202) is not coupled. The length of the strip optical communication element (204) corresponds to the travel distance of the first housing (102) and the second housing (104). The strip optical communication element (204) is located to coincide with the travel path of the point optical communication element (202).

20 Claims, 3 Drawing Sheets

POINT TO STRIP OPTICAL COMMUNICATION SYSTEM

FIELD OF THE INVENTION

The present invention relates generally to a communication system between multiple housings of a device, the multiple housings are adapted to move relative to one another, and more specifically, to a point to strip optical communication system.

BACKGROUND OF THE INVENTION

The present decade has witnessed the increased usage and greater complexity of active elements in a communication device, which need to be physically linked and/or communicatively coupled to other elements in the communication device. Examples of such a communication device include, but are not limited to, a radio telephone, a pager, a laptop, and a Personal Digital Assistant (PDA). Examples of the active elements include, but are not limited to, a camera, a display, and a fingerprint sensor. In at least one common configuration, the communication device can include a first housing and a second housing, where a greater number of the active elements are increasingly being placed in alternative ones of the first housing and the second housing. This has tended to result in an increasing amount of data being conveyed between the first housing and the second housing to transmit data such as video content and audio content between them. The increasing amount of data can be accommodated by an increasing number of data lines and/or an increase in the data rate for at least some of the data lines.

In one of the known methods of conveying data between a first housing and a second housing, the data is routed via a complex multi-layer flex circuit. The multi-layer flex circuit generally includes a multiple layer of high density conductive traces interleaved with an insulating material. The multi-layer flex circuit is then passed through a restricted space between the first housing and the second housing. However, routing a large number of signals through the restricted space can result in the multi-layer flex circuit that is mechanically less reliable and has greater radio-frequency interference. In a slider configuration, a multi-layer electric flex circuit of the communication device should be designed to have a rolling configuration. In the rolling configuration, a minimum bend-radius of the multi-layer electric flex circuit can contribute meaningfully to the thickness of the device.

In some instances involving the transmission of data via a flex circuit, a shield layer can be provided to the multi-layer flex circuit in at least some areas to minimize the radio-frequency interference, caused by the multi-layer flex circuit. However, this often results in an increased stiffness, complexity and cost of the multi-layer flex circuit. In some areas where the multi-layer flex circuit is bent or twisted, the layers will be separated from each other so as to enhance the ability of the multi-layer flex circuit to mechanically flex. However the accommodation of an ability of the layers to separate, and the corresponding separation of the same, can often result in a reduction in the efficiency of the shielding.

Alternatively, any attempt to reduce the number of signals being conveyed by the multi-layer flex circuit to simplify the structure of the same, often requires that the data rates of the signals on at least some of the remaining data lines to be increased, which can result in even greater amounts of the radio-frequency interference.

In light of the above mentioned discussion there is a need for a system for the data transmission between the first housing and the second housing which limits the amount of any radio-frequency interference. Further, the system should accommodate relatively high-speed data transmission between the first housing and the second housing. Furthermore, the system should be cost-effective and easy to assemble, while minimizing the impact on the overall thickness of the device.

SUMMARY OF THE INVENTION

The present invention provides a point to strip optical communication system for data transmission between a first housing and a second housing of a device. Generally, a signal in the form of light (i.e. an electromagnetic radiation) is used in the point to strip optical communication system for the data transmission between the first housing and the second housing of the device. In at least one embodiment of the present invention, the point to strip optical communication system for transmitting light between the first housing and the second housing of the device is provided. The first housing and the second housing can move relative to one another, a distance corresponding to a travel distance between a plurality of different usage positions. The point to strip optical communication system includes a point optical communication element. The point optical communication element is capable of emitting the light and can be coupled to either the first housing or the second housing. The point to strip optical communication system also includes a strip optical communication element that is capable of receiving the light. The strip optical communication element can be coupled to the other one of the first housing and the second housing, to which the point optical communication is not coupled. The length of the strip optical communication element can correspond to the travel distance of the first housing and the second housing. The strip optical communication element can be located to coincide with a travel path of the point optical communication element.

In a further embodiment of the present invention, a device is provided. The device can include a two part housing that includes a first housing and a second housing, which are adapted to move, relative to one another. The device can also include one or more point to strip optical communication systems for transmitting light between the first housing and the second housing. Further, each of the one or more point to strip optical communication systems can include a point optical communication element, which is capable of emitting the light. The point optical communication element can be coupled to either the first housing or the second housing. The point to strip optical communication system can also include a strip optical communication element that is capable of receiving the light. The strip optical communication element can be coupled to the other one of the first housing and the second housing to which the point optical communication element is not coupled. The length of the strip optical communication element can correspond to a travel distance of the first housing and the second housing. The strip optical communication element can be located to coincide with a travel path of the point optical communication element.

These and other features, as well as the advantages of this invention, are evident from the following description of one or more embodiments of this invention, with reference to the accompanying figures.

BRIEF DESCRIPTION OF FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Figure 1:
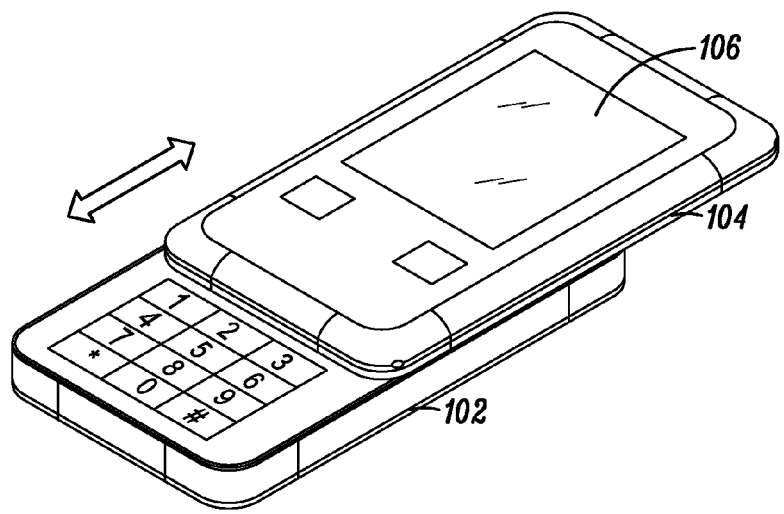
FIG. 1 illustrates a device having a two part housing which is adapted to move relative to one another, where various embodiments of the present invention can be applicable.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of embodiments of the present invention.

DETAILED DESCRIPTION

Before describing in detail the particular system for communication, in accordance with the present invention, it should be observed that the present invention resides primarily as apparatus components related to a point to strip optical communication system. Accordingly, the apparatus components have been represented where appropriate by conventional symbols in the drawings, showing only those specific details that are pertinent for an understanding of the present invention, so as not to obscure the disclosure with details that will be readily apparent to those with ordinary skill in the art, having the benefit of the description herein.

In this document, the terms "comprises," "comprising," or any other variation thereof are intended to cover a non-exclusive inclusion, such that an article or apparatus that comprises a list of elements does not include only those elements, but may include other elements that are not expressly listed or inherent in such an article or apparatus. An element proceeded by "comprises . . . a" does not, without more constraints, preclude the existence of additional identical elements in the article or apparatus that comprises the element. The term "another," as used in this document, is defined as at least a second or more. The terms "includes" and/or "having", as used herein, are defined as comprising.

FIG. 1 illustrates a device 100, where various embodiments of the present invention can be applicable. Examples of the device 100 include, but are not limited to, a wireless communication device, a radio telephone, a pager, a laptop, a music playback device (i.e. MP3 Player), and a Personal Digital Assistant (PDA). The device 100 includes a first housing 102 and a second housing 104. The first housing 102 and the second housing 104 can move relative to one another a distance corresponding to a travel distance of either the first housing 102 or the second housing 104, between a plurality of different usage positions. The travel distance is a relative distance traversed either by the first housing 102 or the second housing 104 with respect to the other while moving between usage positions. In at least one embodiment of the present invention, the plurality of different usage positions can include, but are not limited to, a closed position and an open position of the first housing 102 and the second housing 104. The doubly pointed arrow in FIG. 1 illustrates a potential movement of the first housing 102 and the second housing 104 relative to one another, which results in a closed position, an open position, and any number of positions therebetween. In the particular embodiment illustrated, the first housing 102 and the second housing 104 can travel along a pair of substantially parallel paths relative to one another. This is sometimes referred to as a slider configuration.

In a further embodiment of the present invention, either the first housing 102 or the second housing 104 can include one or more active elements that each need to be physically and/or communicatively coupled to one or more corresponding elements present on the other one of the first housing 102 or the second housing 104. Examples of the active elements include, but are not limited to, a camera, a display and a fingerprint sensor. For example, a camera present on the first housing 102 may need to be coupled to a microprocessor present on the second housing 104.

Figure 2:
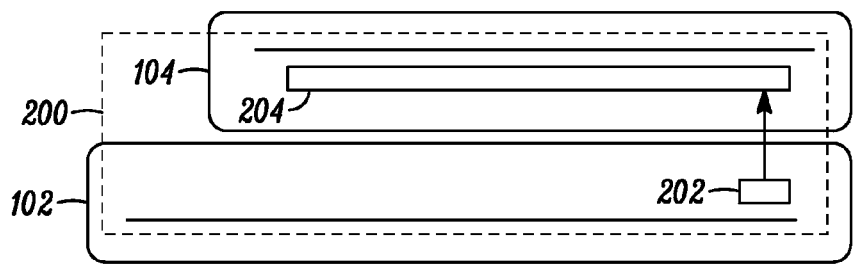
FIG. 2 illustrates a cross-sectional view of a point to strip optical communication system for use in a device having a first housing and a second housing, in accordance with at least one embodiment of the present invention.

FIG. 2 illustrates a cross-sectional view of a point to strip optical communication system 200 of a device having a first housing 102 and a second housing 104, in accordance with at least one embodiment of the present invention. Examples of the device can include the device 100, illustrated in FIG. 1. As noted above, in accordance with at least some embodiments of the present invention, the first housing 102 and the second housing 104 can be incorporated as part of a device with a slider configuration. The point to strip optical communication system 200 includes a point optical communication element 202, which is capable of emitting light. The point optical communication element 202 can be coupled either to the first housing 102 or to the second housing 104. Examples of the point optical communication element 202 can include, but are not limited to, an edge-emitting laser source, a vertical-cavity surface emitting laser (VCSEL), and a light-emitting diode. Generally, the point optical communication element 202 produces a light having one or more characteristics which can be varied so as to encode and/or superimpose a stream of data on the light being produced. Examples of light characteristics which might be varied for the purpose of encoding data in the light being produced includes amplitude, frequency, and phase.

The point to strip optical communication system 200 also includes a strip optical communication element 204, which is capable of receiving and/or detecting the light including the changing characteristics of the light that is being emitted by the point optical communication element 202. An example of the strip optical communication element 204 can include, but is not limited to, a photodiode. The strip optical communication element 204 can be coupled to the other one of the first housing 102 and the second housing 104 to which the point optical communication element 202 is not coupled. In at least one embodiment of the present invention, the length of the strip optical communication element 204 can correspond to a travel distance of either the first housing 102 or the second housing 104. Furthermore, the strip optical communication element 204 is located so as to coincide with a travel path of the point optical communication element 202, where the travel path includes a set of points corresponding to the position of the point optical communication element 202 as the first housing 102 and/or the second housing 104 move between the plurality of different usage positions. As a result of the strip optical communication element 204 extending along the length of the travel path of the point optical communication element 202, the light emitted by the point optical communication element 202 can strike the strip optical communication element 204, irrespective of the position of the first housing 102 and the second housing 104.

In at least one embodiment of the present invention, a first point optical communication element can be coupled to the first housing 102, and a corresponding first strip optical communication element can be coupled to the second housing 104. Further, a second point optical communication element can be coupled to the second housing 104 and a corresponding second strip optical communication element can be coupled to the first housing 102. The two corresponding pairs of point optical communication elements and strip optical communication elements can enable bi-directional optical data transmission between the first housing 102 and the second housing 104, consistent with the embodiment illustrated in FIG. 5.

Figure 3:
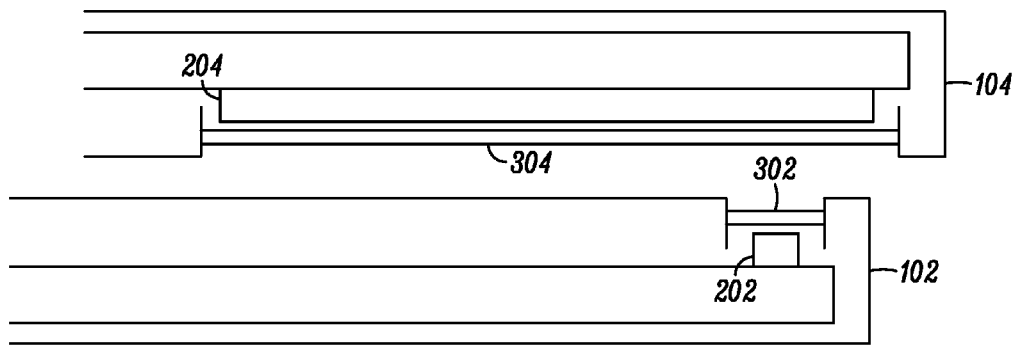
FIG. 3 illustrates the point to strip optical communication system, in accordance with at least one embodiment of the present invention.

FIG. 3 illustrates the point to strip optical communication system 200, in accordance with at least one embodiment of the present invention, for use in a device, such as the device 100 illustrated in FIG. 1. The point to strip optical communication system 200 includes a point optical communication element 202, which is coupled to the first housing 102. The first housing 102 additionally includes an aperture 302, which is aligned with respect to the point optical communication element 202, such that the aperture 302 can convey the light emitted by the point optical communication element 202 to a strip optical communication element 204, which is included as part of the second housing 104. Generally, the size of the aperture 302 is related to the size of the point optical communication element, and is further related to the corresponding size, direction, and shape of the beam of light produced thereby and/or is related to the desired size, direction, and shape of the beam of light to be conveyed. In at least one embodiment of the present invention, the aperture 302 can be formed by a slit cut in the respective housing. In some instances, the point optical communication element 202 can be protected by a window, which is placed so as to coincide with the aperture 302. The window can be made of an optically transparent material, which allows the light produced by the point optical communication element 202 to pass through the same. In some of these instances, the window can be in the form of a lens, which can help to further shape and direct the light passing through the same.

Additionally, the strip optical communication element 204 has an aperture 304, which can also include a window that is similarly comprised of an optically transparent material capable of allowing light to pass. Examples of a suitable optically transparent material for use in forming at least part of one or both of the windows which can be associated with each of the point optical communication element 202 and the strip optical communication element 204 include, but are not limited to, a plastic material and a glass material. The length of the aperture 304 is sized to accommodate and/or encompass the various usage positions of the device as the first and second housing move relative to one another, along the corresponding travel distance, which are intended to support optical communication between the first and second housings. In this way, the point optical communication element 202 can remain in communicational alignment at each of the anticipated usage positions. The use of a window can help limit environmental contaminants such as dust, smoke, or other particles and/or contaminants from entering the housing and interfering with the optical communication path. One skilled in the art can readily appreciate that while the point optical communication element 202 and the corresponding aperture 302 is shown in association with the first housing 102, the point optical communication element 202 and the corresponding aperture 302 could alternatively be associated with the second housing 104, in which case the associated strip optical communication element 204 and any corresponding window 304 would likely be associated with the first housing 102.

Figure 4:
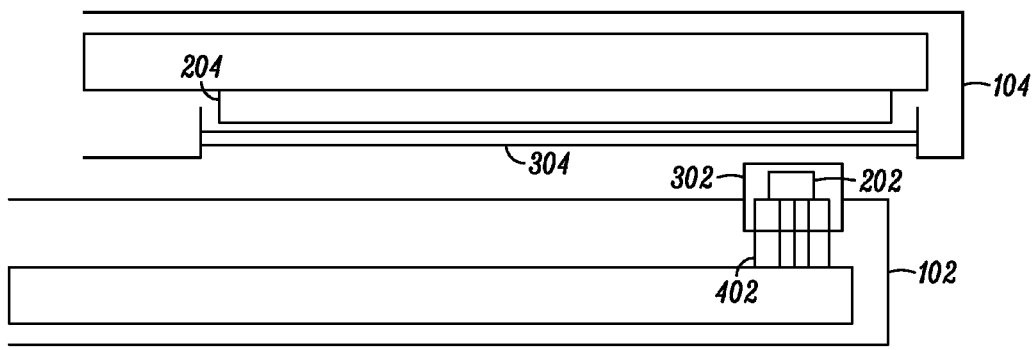
FIG. 4 illustrates the point to strip optical communication system, in accordance with another embodiment of the present invention.

FIG. 4 illustrates the point to strip optical communication system 200, in accordance with another embodiment of the present invention. In addition to the point optical communication element 202 and the strip optical communication element 204, the point to strip optical communication system 200 also includes a mechanical mount 402. The mechanical mount 402 is used to elevate the point optical communication element 202 relative to a circuit substrate, which in turn allows the point optical communication element 202 to be brought into closer proximity to the strip optical communication element 204. This closer proximity can enable use of a lower-power point optical communication element 202. Furthermore, closer proximity can simplify the alignment between the point optical communication element 202 and the strip optical communication element 204, thereby allowing for greater flexibility regarding the corresponding tolerances associated with the orientation and placement of each of the elements relative to one another and other surrounding structures. One skilled in the art will readily appreciate that it is alternatively possible to reposition the strip optical communication element 204 through the use of a spacer or other corresponding structure relative to the point optical communication element 202. However, because of the differences in size and shape, it is generally easier to adjust the position of the point optical communication element 202.

Figure 5:
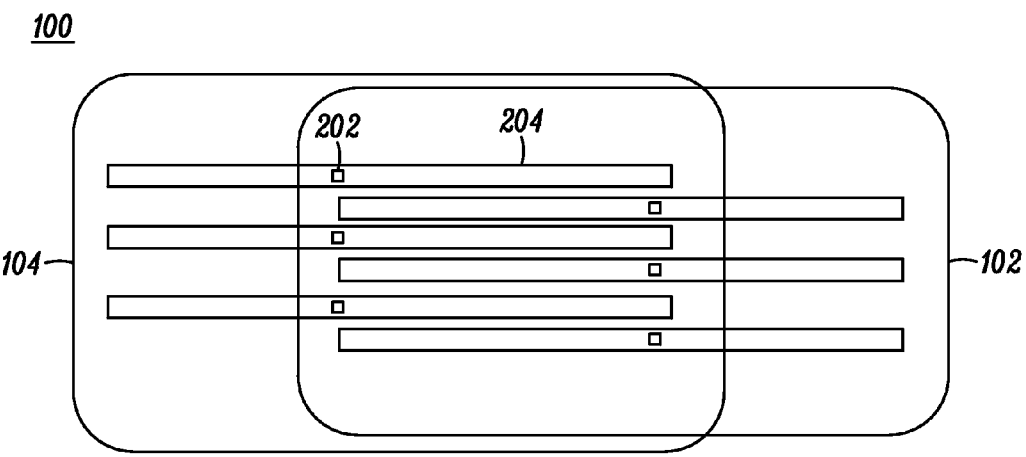
FIG. 5 illustrates an example of a point to strip optical communication system of a device having a plurality of point to strip optical communication paths, in accordance with at least one embodiment of the present invention.

FIG. 5 illustrates the device 100, incorporating multiple point to strip optical communication systems 200, in accordance with at least some embodiments of the present invention. The one or more point to strip optical communication systems 200 are each capable of independently transmitting light between the first housing 102 and the second housing 104, which each can be encoded with a stream of data through a modification of one or more characteristics of the light produced by each of the point optical communication elements 202. For example, the one or more point to strip optical communication systems 200 can include a first point to strip optical communication system with the point optical communication element 202 coupled to the first housing 102 and the corresponding strip optical communication element 204 coupled to the second housing 104. The one or more point to strip optical communication systems 200 can also include a second point to strip optical communication system with the point optical communication element 202 coupled to the second housing 104, and the corresponding strip optical communication element 204 coupled to the first housing 102. The present embodiment can enable data transmission between a plurality of active elements on either the first housing 102 or the second housing 104 to the corresponding elements on the other one of the first housing 102 and the second housing 104. In at least some instances, a higher bandwidth signal encoded in the characteristics of the light can be used for the optical communication of data. The higher bandwidth signal might enables multiplexing of multiple electric signal streams onto a single optical channel, where if the same higher bandwidth signal was conveyed electronically via a wired connection, it might produce unwanted levels of electromagnetic noise or interference. This can help in reducing the number of the one or more point to strip optical communication systems 200 that are used for supporting the optical communication between the first housing 102 and the second housing 104.

Figure 6:
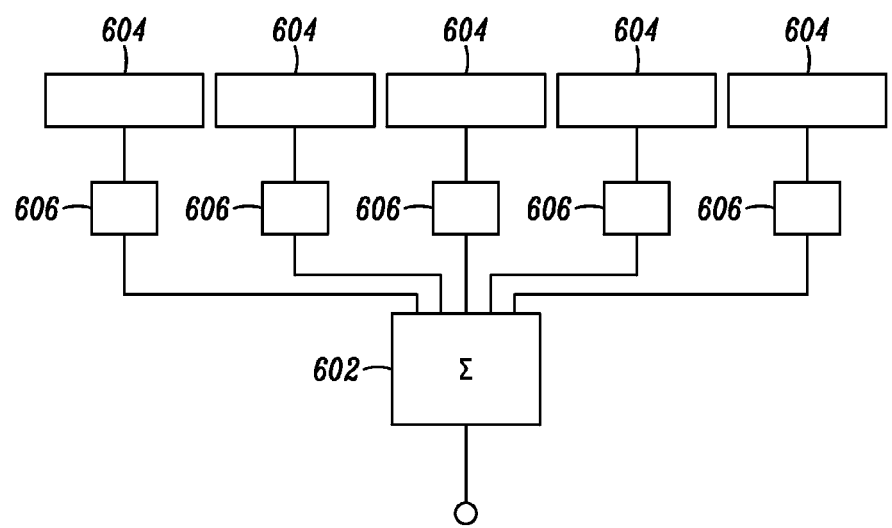
FIG. 6 illustrates an electrical circuit of a device, in accordance with at least one embodiment of the present invention.

FIG. 6 illustrates an electrical circuit 600 for use in connection with some instances of the strip optical communication element 204. The electrical circuit 600 includes an electrical summation circuit 602, which is used to sum the detected photo-currents from multiple detectors 604. The multiple detectors 604 can be used when the strip optical communication element 204 is not available as a single long detector bar, but which might be alternatively formed by a larger number of smaller detector bars. In a further embodiment of the present invention, a trans-impedance amplifier 606 can be used in conjunction with the detectors 604. The trans-impedance amplifier 606 can convert the detected photo-currents into voltage signals. The electrical summation circuit 602 can then sum up the voltage signals from the trans-impedance amplifiers 606. The electrical summation circuit 602 can also interpolate the light in gaps between the one or more detector 604, based on the detected photo-currents from adjacent detectors 604.

Various embodiments of the present invention, as described above, enable optical communication of data. The point to strip optical communication system enables cost effective high speed optical communication of data. The point to strip optical communication system provided in the present invention does not involve the use of a multi-layer electric flex circuit, thereby increasing reliability of the device, avoiding a source of radio-frequency interference, and simplifying the assembly of the device. The present invention also enables further reduction in thickness of the device, relative to devices that alternatively employ the above mentioned flex circuit.

In the foregoing specification, the invention, as well as its benefits and advantages, have been described with reference to specific embodiments. However, one with ordinary skill in the art would appreciate that various modifications and changes can be made, without departing from the scope of the present invention, as set forth in the claims below. Accordingly, the specification and figures are to be regarded in an illustrative rather than a restrictive sense. All such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application and all equivalents of those claims, as issued.

What is claimed is:

1. A point to strip optical communication system for transmitting light between a first housing and a second housing of a device, the first housing and the second housing moving relative to one another a distance corresponding to a travel distance between a plurality of usage positions, the point to strip optical communication system comprising:

a point optical communication element capable of emitting the light, the point optical communication element being coupled to one of the first housing and the second housing; and a strip optical communication element capable of receiving the light, the strip optical communication element being coupled to other one of the first housing and the second housing to which the point optical communication element is not coupled, wherein a length of the strip optical communication element corresponds to the travel distance of the first housing and the second housing, and wherein the strip optical communication element is located to coincide with a travel path of the point optical communication element.

2. A point to strip optical communication system of claim 1, wherein the first housing and the second housing travel along respective ones of a pair of substantially parallel paths.

3. A point to strip optical communication system of claim 1, wherein the first housing and the second housing are incorporated as part of a communication device having a slider configuration.

4. A point to strip optical communication system of claim 1, wherein the point optical communication element is selected from the group comprising an edge-emitting laser source, a vertical-cavity surface emitting laser and a light-emitting diode.

5. A point to strip optical communication system of claim 1, wherein the strip optical communication element is a photodiode.

6. A point to strip optical communication system of claim 1, wherein one of the first housing and the second housing to which the point optical communication element is coupled comprises an aperture for conveying the light emitted by the point optical communication element, and wherein the aperture is aligned with the point optical communication element.

7. A point to strip optical communication system of claim 1, wherein at least one of the point optical communication element and the strip optical communication element is shielded by a window including an optically transparent material.

8. A point to strip optical communication system of claim 7, wherein the optically transparent material is selected from the group comprising a plastic material and a glass material.

9. A point to strip optical communication system of claim 1, wherein the strip optical communication element comprises one or more detectors.

10. A point to strip optical communication system of claim 9 further comprising an electrical circuit summing detected photo-currents of the one or more detectors.

11. A point to strip optical communication system of claim 1 further comprising a mechanical mount present on the first housing and the second housing to which the point optical communication element is coupled, wherein the point optical communication element is mounted on the mechanical mount, and wherein the mechanical mount brings the point optical communication element in close proximity to the strip optical communication element.

12. A device comprising:

a two part housing comprising a first housing and a second housing adapted to move relative to one another; and one or more point to strip optical communication systems, each of the one or more point to strip optical communication systems capable of transmitting light between the first housing and the second housing, wherein each of the one or more point to strip optical communication systems comprising:

a point optical communication element capable of emitting the light, the point optical communication element being coupled to one of the first housing and the second housing; and a strip optical communication element capable of receiving the light, the strip optical communication element being coupled to other one of the first housing and the second housing to which the point optical communication element is not coupled, wherein a length of the strip optical communication element corresponds to a travel distance between a plurality of usage positions of the first housing and the second housing, and wherein the strip optical communication element is located to coincide with a travel path of the point optical communication element.

13. A device of claim 12, wherein the point optical communication element is selected from the group comprising an edge-emitting laser source, a vertical-cavity surface emitting laser and a light-emitting diode.

14. A device of claim 12, wherein the strip optical communication element is a photodiode.

15. A device of claim 12, wherein one of the first housing and the second housing to which the point optical communication element is coupled comprises an aperture for conveying the light emitted by the point optical communication element, and wherein the aperture is aligned with the point optical communication element.

16. A device of claim 12, wherein at least one of the point optical communication element and the strip optical communication element is shielded by a window including an optically transparent material.

17. A device of claim 16, wherein the optically transparent material is selected from the group comprising a plastic material and a glass material.

18. A device of claim 12, wherein the strip optical communication element comprises one or more detectors.

19. A device of claim 12, wherein the one or more point to strip optical communication systems comprise a first point to strip optical communication system having a point optical communication element coupled to the first housing and a corresponding strip optical communication element coupled to the second housing, and a second point to strip optical communication system having a point optical communication element coupled to the second housing and a corresponding strip optical communication element coupled to the first housing.

20. A device of claim 12, wherein the device is a wireless communication device.

* * * * *